United States Patent
Qi

(10) Patent No.: US 10,944,553 B2
(45) Date of Patent: Mar. 9, 2021

(54) SIMULTANEOUS CLASSICAL AND QUANTUM COMMUNICATION SCHEME BASED ON COHERENT DETECTION

(71) Applicant: UT-Battelle, LLC, Oak Ridge, TN (US)

(72) Inventor: Bing Qi, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 498 days.

(21) Appl. No.: 15/952,873

(22) Filed: Apr. 13, 2018

(65) Prior Publication Data

US 2018/0316496 A1 Nov. 1, 2018

Related U.S. Application Data

(60) Provisional application No. 62/492,372, filed on May 1, 2017.

(51) Int. Cl.
*H04L 9/08* (2006.01)
*H04L 27/20* (2006.01)
(Continued)

(52) U.S. Cl.
CPC ......... *H04L 9/0852* (2013.01); *H04B 10/503* (2013.01); *H04B 10/516* (2013.01);
(Continued)

(58) Field of Classification Search
CPC ... H04L 9/0852; H04L 9/0855; H04L 9/0858; H04L 27/2017; H04B 10/502;
(Continued)

(56) References Cited

U.S. PATENT DOCUMENTS

2020/0204362 A1* 6/2020 Li ..................... H04L 9/0852

OTHER PUBLICATIONS

Kim et al., Simultaneous classical communication and quantum key distribution based on Gaussian modulated coherent states, Aug. 5, 2016, IEICE Electronics Express, vol. 13, No. 16, pp. 1-7 (Year: 2016).*

(Continued)

*Primary Examiner* — Robert B Leung
*Assistant Examiner* — Adrian Stoica
(74) *Attorney, Agent, or Firm* — Warner Norcross + Judd LLP

(57) ABSTRACT

An improved coherent communication scheme is provided. The coherent communication scheme encodes both classical and quantum information simultaneously using isolated groups of states: classical information is represented by different groups and can be decoded deterministically; and quantum information is represented by highly overlapped states within the same group, thus guaranteeing security. Decoding includes projecting the detection results at the receiver to one of the distinguishable encoding groups first, which allows the classical information to be read out, and then generating a quantum key from the residual randomness. This communications scheme enables simultaneous classical communication and QKD over the same communication channel using the same transmitter and receiver, opening the door to operate QKD in the background of classical communication and at negligible costs.

16 Claims, 5 Drawing Sheets

(51) Int. Cl.
    *H04B 10/50*     (2013.01)
    *H04B 10/61*     (2013.01)
    *H04B 10/516*     (2013.01)
    *H04B 10/70*     (2013.01)

(52) U.S. Cl.
    CPC ........... *H04B 10/61* (2013.01); *H04B 10/612* (2013.01); *H04B 10/613* (2013.01); *H04B 10/70* (2013.01); *H04L 9/0855* (2013.01); *H04L 27/2017* (2013.01)

(58) Field of Classification Search
    CPC .. H04B 10/503; H04B 10/508; H04B 10/516; H04B 10/61; H04B 10/612; H04B 10/613; H04B 10/63; H04B 10/64; H04B 10/70

See application file for complete search history.

(56) References Cited

OTHER PUBLICATIONS

Patron et al., Continuous-Variable Quantum Key Distribution Protocols Over Noisy Channels, Apr. 3, 2009, The American Physical Society, pp. 1-4 (Year: 2009).*

Diamanti et al., Distributing Secret Keys with Quantum Continuous Variables: Principle, Security and Implementations, 2015, Entropy 2015, 17, pp. 6072-6092. (Year: 2015).*

* cited by examiner

SIMULTANEOUS CLASSICAL AND QUANTUM COMMUNICATION SCHEME BASED ON COHERENT DETECTION

CROSS-REFERENCE TO RELATED APPLICATION

This application claims the benefit of U.S. Provisional Application 62/492,372, filed May 1, 2017, the disclosure of which is hereby incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

BACKGROUND OF THE INVENTION

The present invention is directed to the simultaneous transmission of classical and quantum information over optical networks. The following publication by the present inventor is incorporated by reference in its entirety: "Simultaneous classical communication and quantum key distribution using continuous variables," B. Qi, Phys. Rev. A, 94, 042340 (2016).

Classical optical communication protocols employing strong laser pulses and quantum communication systems working at single-photon levels possess very different communication modalities. While classical communications can be conducted through existing fiber optic networks efficiently and reliably, dedicated (and expensive) devices are required to implement quantum communication protocols, such as quantum key distribution (QKD). However, the high implementation costs of QKD communication protocols limits its application.

In particular, QKD involves the application of quantum physics to generate and distribute a shared key for encrypted communications. The security of the key is based on features of quantum physics, rather than assumptions regarding computationally difficult problems. QKD exploits quantum phenomena to enable communications that can only be intercepted by violating known laws of physics. QKD systems have been physically demonstrated to be invulnerable to eavesdropping attacks, but are significantly more expensive when compared to classical optical communication protocols.

Accordingly, there remains a continued need for a communication scheme that combines advantages of classical communication and QKD over existing fiber optic networks at a reduced operational cost when compared to QKD systems alone.

SUMMARY OF THE INVENTION

An improved communication scheme is provided. The communication scheme encodes both classical and quantum information simultaneously using isolated groups of states: classical information is represented by different groups and can be decoded deterministically; and quantum information is represented by highly overlapped states within the same group, thus guaranteeing security. Decoding includes projecting the detection results at the receiver to one of the distinguishable encoding groups first, which allows the classical information to be read out, and then generating a quantum key from the residual randomness.

In one embodiment, classical communication and QKD are performed simultaneously and on the same platform with binary phase-shift keying (BPSK) and Gaussian-modulated coherent states (GMCS) QKD. The bits for classical communication and the Gaussian distributed random numbers for GMCS QKD are encoded on the same weak coherent pulse, and are decoded by the same coherent receiver. The random numbers for QKD are superimposed on classical communication signals, and the secure key distribution is conducted in the background of classical communication. This communication scheme overcomes the high implementation costs of QKD, with the QKD performance being dependent upon the phase noise of the coherent communication system. This communications scheme also enables simultaneous classical communication and QKD over the same communication channel using the same transmitter and receiver, opening the door to operate QKD in the background of classical communication over tens of kilometers of optical fiber and at negligible additional costs.

These and other features and advantages of the present invention will become apparent from the following description of the invention, when viewed in accordance with the accompanying drawings and appended claims.

DETAILED DESCRIPTION OF THE CURRENT EMBODIMENT

The current embodiment includes a hybrid communications scheme in which classical information is encoded in the displacement of QKD signals. This communications scheme enables simultaneous classical communication and QKD over the same communication channel using the same transmitter and receiver, thereby overcoming the implementation costs of QKD. The current embodiment includes BPSK and GMCS QKD, however other communication protocols can be used in other embodiments, including for example quadrature phase-shift keying (QPSK). BPSK and GMCS QKD are briefly discussed below.

Figure 1:
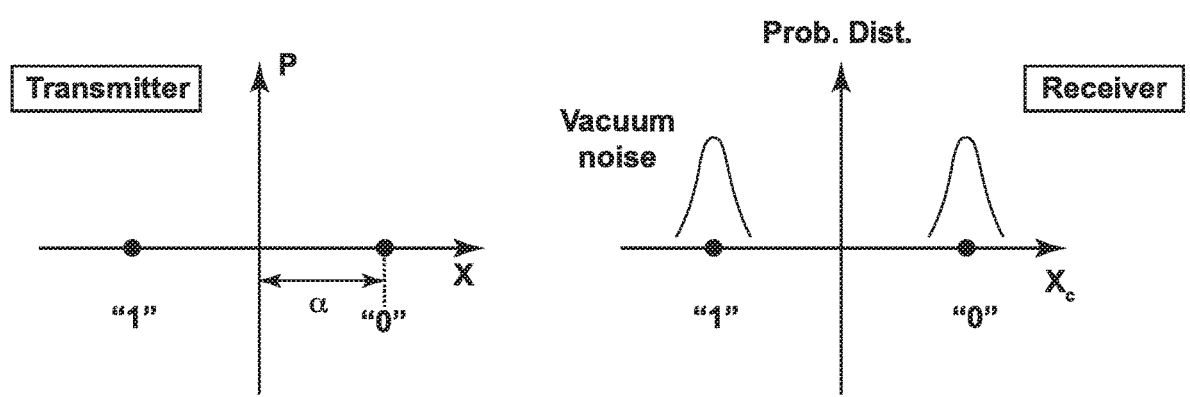
FIG. 1 is a phase space representation of the BPSK modulation scheme.

In a BPSK modulation scheme, classical binary information is encoded on the phase of a coherent state and is decoded by performing optical homodyne detection. More specifically, the classic bit value $m_A$ ($m_A=0, 1$) is encoded by the optical phase $\varphi$ ($\varphi=0, \pi$) as shown in FIG. 1. The probability density function (PDF) of the measurement result X in BPSK is also shown in FIG. 1 (at right). The receiver can decode binary information using the sign of X, e.g., if X>0 (<0), the bit value is assigned as "0" ("1"). The bit error rate (BER) of the BPSK scheme is determined by the measurement error variance and the signal amplitude.

Given the homodyne detector is shot-noise limited (the technical noise is much lower than the vacuum noise), the required signal amplitude for a BER of $10^{-9}$ is about 9 photons at the receiver's end.

Figure 2:
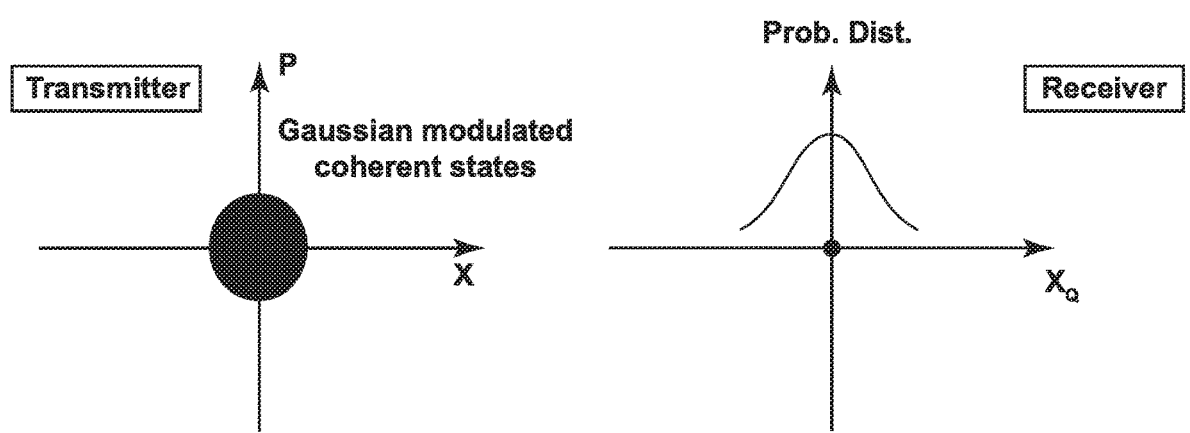
FIG. 2 is a phase space representation of the GMCS QKD modulation scheme.

In a GMCS QKD modulation scheme, Gaussian distributed random numbers are encoded on two conjugate quadratures (X and P) of weak laser pulses, as shown in FIG. 2. After quantum transmission, the sender and the receiver share some correlated data. More particularly, the receiver can perform either optical homodyne detection to measure a randomly chosen quadrature or perform optical heterodyne detection to measure both quadratures simultaneously. After quantum transmission, the receiver announces which quadrature is measured for each incoming signal through an authenticated classical channel, and the sender keeps only the corresponding data. If the observed noise is below a certain threshold, they can further work out a secret key by performing reconciliation and privacy amplification.

In the current embodiment, the above two modulation schemes are combined together. The sender encodes both the classical bit $m_A$ and the Gaussian distributed random numbers $(x_A, p_A)$ (or random number from a non-Gaussian distribution) on the same laser pulse, shown in FIG. 3. In GMCS QKD based on homodyne detection, the receiver measures either X or P quadrature of each incoming signal. To achieve deterministic classical communication, the same classical bit $m_A$ can be encoded on both X and P quadrature. If heterodyne detection is employed, the sender only needs to encode $m_A$ on one quadrature. From the measurement result $x_R$ (or $p_R$), the receiver can decode classical bit $m_B$ using the sign of $x_R$ (or $p_R$), e.g., if $x_R$ (or $p_R$)>0, then the value of $m_B$ is assigned as "0." Otherwise, the value of $m_B$ is assigned as "1." To further generate the secure key, the receiver displaces and rescales the measurement result based on the value of $m_B$ as:

$$x_B = x_R + 2m_B - 1 \quad (1)$$

$$p_B = p_R + 2m_B - 1 \quad (2)$$

The sender and the receiver can work out a secret key from $\{x_A; x_B\}$ and $\{p_A; p_B\}$, just as in the case of conventional GMCS QKD. Essentially, the states prepared by the sender are displaced Gaussian modulated coherent states, where the amount of the displacement is determined by the classical bit $m_A$. Given a modulation variance of the Gaussian random numbers, the BER of classical communication can be reduced effectively by using a large displacement.

Figure 4:
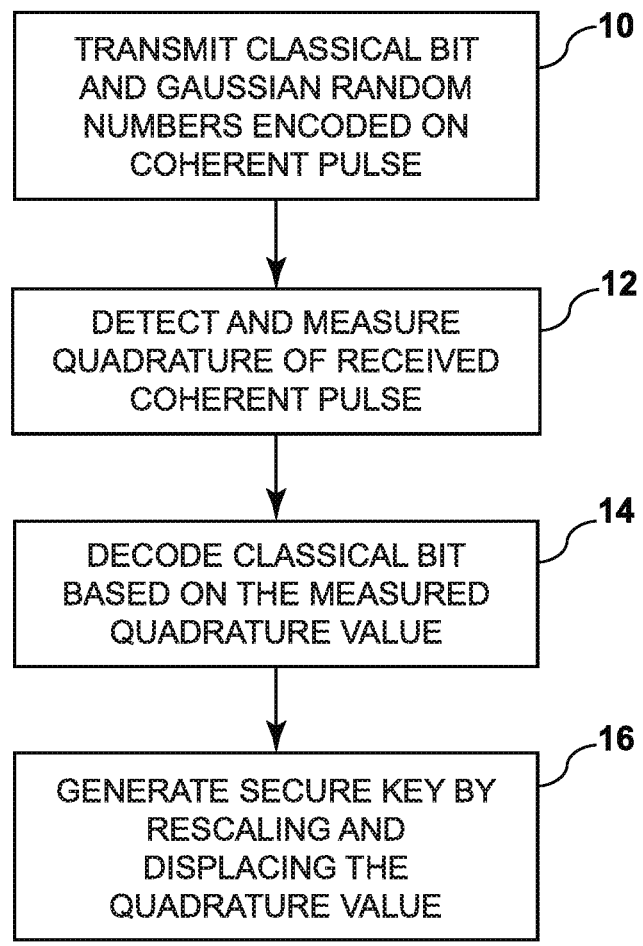
FIG. 4 is a flow chart illustrating the simultaneous BPSK and GMCS QKD modulation scheme of the current embodiment.

Referring now to FIG. 4, a flow chart illustrating a method for simultaneous classical communication and QKD protocol in accordance with one embodiment is presented. In general terms, the method can include the following steps: (a) transmitting an optical pulse from a laser light source, the optical pulse carrying phase-encoded binary information and Gaussian-distributed random numbers; (b) detecting the optical pulse at an optical coherent receiver; (c) decoding the phase-encoded binary information from the optical pulse; and (d) generating a quantum key by measuring at least one quadrature value of the optical pulse. If only one quadrature is measured, the method further includes informing a sender of the optical pulse of the quadrature that was measured. Each step is discussed below.

Figure 3:
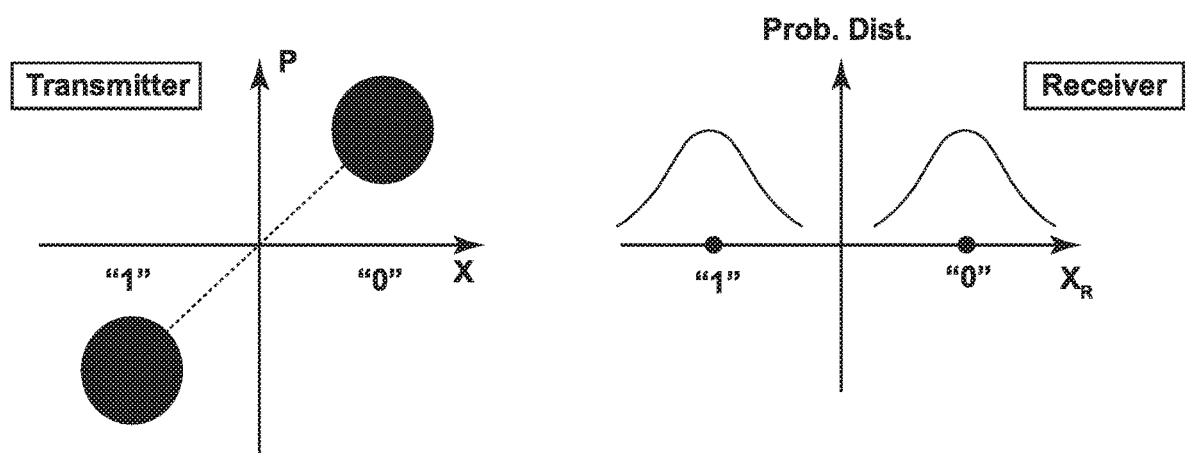
FIG. 3 is a phase space representation of the simultaneous BPSK and GMCS QKD modulation scheme in accordance with an embodiment of the present invention.

Transmitting an optical pulse is depicted as step 10 in FIG. 4. This step generally includes selecting, at the sender, two random numbers $\{x_A, p_A\}$ from a Gaussian distribution and encoding a classical bit $m_A$ and the random numbers $\{x_A, p_A\}$ on a coherent state: $|(x_A + e^{-im_A\pi}\alpha) + i(p_A + e^{-im_A\pi}\alpha)\rangle$, as shown in FIG. 3. The classical bit $m_A$ is encoded in the X quadrature, P quadrature, or both quadratures of an optical pulse transmitted to the recipient. If both quadratures are encoded, homodyne detection can be used at the recipient. If only one quadrature is encoded, heterodyne detection can be used at the recipient.

Detecting the optical pulse is depicted as step 12 in FIG. 4. This step generally includes detecting the optical pulse at an optical coherent receiver that is coupled to a laser light source (e.g., a laser diode) of the sender via an optical channel. If homodyne detection scheme is chosen, this step additionally includes randomly choosing, at the receiver, to measure quadrature X or quadrature P in accordance with the GMCS QKD protocol to obtain $\{x_R, p_R\}$.

Decoding the phase-encoded binary information from the optical pulse is depicted at step 14 in FIG. 4. This step generally includes determining, at the receiver, bit $m_B$ using the sign of a measured quadrature value $\{x_R, p_R\}$. If the receiver measured the X quadrature, the measurement result is $x_R$. If the receiver measured the P quadrature, the measurement result is $p_R$. Determining the bit $m_B$ includes assigning a binary value based on whether the measured quadrature value $\{x_R, p_R\}$ is positive or negative. For example, if $x_R$ is >0, the value of $m_B$ is assigned as "0" but if $x_R$ is <0 the value of $m_B$ is assigned as "1." These values can be reversed, such that if $x_R$ is >0, the value of $m_B$ is assigned as "1" but if $x_R$ is <0 the value of $m_B$ is assigned as "0." Similarly, if $p_R$ is >0, the value of $m_B$ is assigned as "0" (or "1") but if $p_R$ is <0 the value of $m_B$ is assigned as "1" (or "0").

Generating a quantum key is depicted as step 16 in FIG. 4. This step generally includes rescaling and displacing, at the receiver, the measured quadrature value $\{x_R, p_R\}$ based on the value of $m_B$. This step can performed according to equations (1) and (2) above, or according to equations (3) and (4) below, based on the signal amplitude $\alpha$ and overall transmittance $T_{ch}\eta$:

$$x_B = \frac{x_R}{\sqrt{T_{ch}\eta}} + (2m_B - 1)\alpha \quad (3)$$

$$p_B = \frac{p_R}{\sqrt{T_{ch}\eta}} + (2m_B - 1)\alpha \quad (4)$$

The resulting Gaussian values $\{x_B, p_B\}$ can be converted into a secret key in accordance with GMCS QKD. In particular, the recipient can inform the sender of the quadrature that was measured and can perform reconciliation (direct or reverse) and privacy amplification protocols. In direct (reverse) reconciliation, the sender (the recipient) sends additional classical information to the recipient (the sender) to implement error correction and generate an error-free key. In privacy amplification, the above error-free key will be further shortened to remove any information an eavesdropper could have and generate a final secure key.

Figure 5:
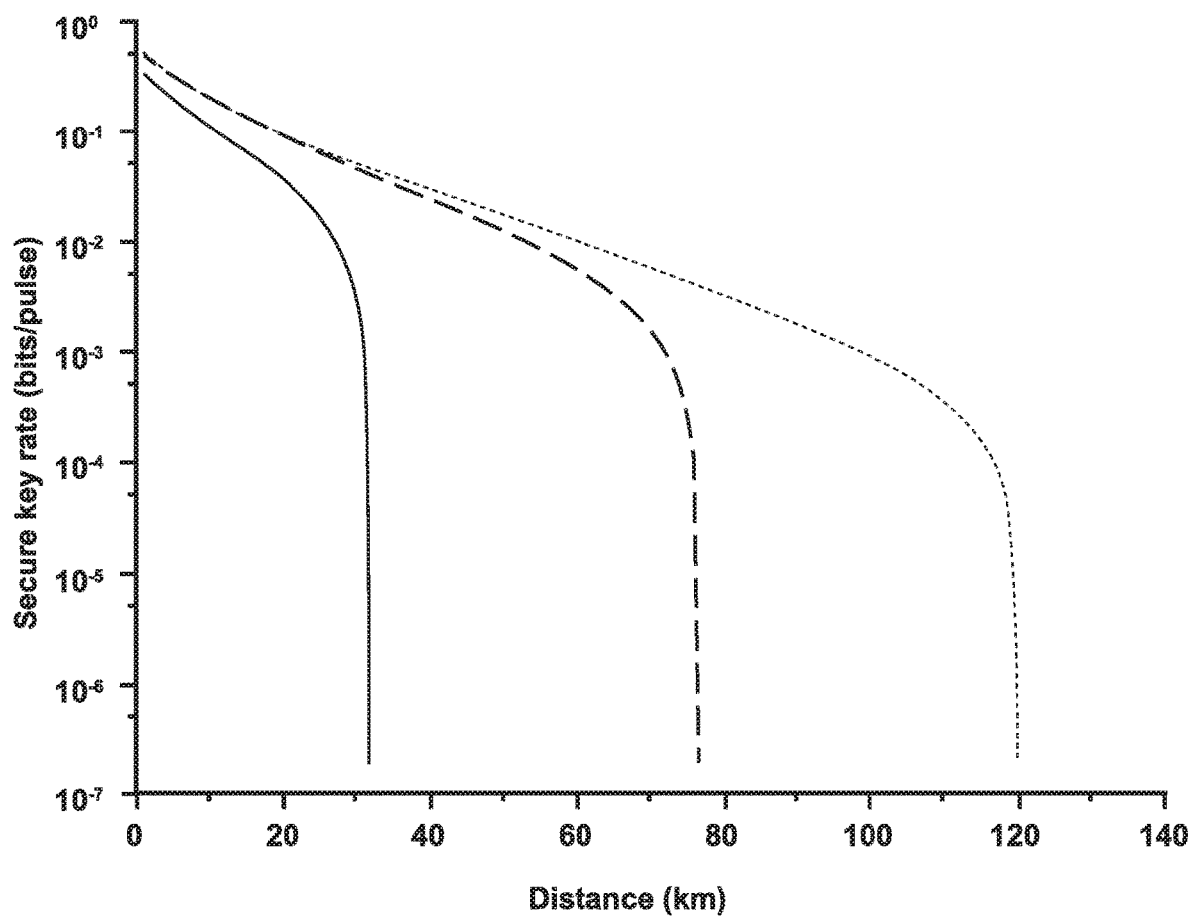
FIG. 5 is a graph illustrating simulation results for the simultaneous BPSK and GMCS QKD modulation scheme of the current embodiment.

Numerical simulations of secure key rate at different phase noise variations were performed according to the hybrid communications scheme of the current embodiment. The simulation results are shown in FIG. 5. The performance of the hybrid communications scheme was found to be heavily dependent on the phase noise of the system. The results suggested that simultaneous classical and QKD over tens of kilometers of optical fiber is possible.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A method for coherent optical communications between a sender and a receiver, the method comprising:
selecting, at the sender, two random numbers $\{x_A, p_A\}$;
encoding, at the sender, bit $m_A$ and $\{x_A, p_A\}$ on a coherent state being sent through an optical channel to the receiver, wherein encoding bit $m_A$ on a coherent state comprises phase-shift keying modulation of an optical pulse;
randomly choosing, at the receiver, to measure quadrature X or P with a homodyne detector;
determining, at the receiver, bit $m_B$ using the sign of a measured quadrature value $\{x_R, \text{ or } p_R\}$;
displacing, at the receiver, the measured quadrature value $\{x_R, \text{ or } p_R\}$ based on the value of $m_B$ to achieve displaced values $\{x_B, \text{ or } p_B\}$ of the corresponding quadrature X or P according to $x_B = x_R + 2m_B - 1$ or $p_B = p_R + 2m_B - 1$, respectively; and
informing the sender of the quadrature X or P that was measured, and converting, at the receiver and at the sender, the corresponding quadrature values $\{x_A, x_B\}$ or $\{p_A, p_B\}$ into a secret key.

2. The method according to claim 1 wherein the bit $m_A$ is encoded in the X or P quadrature of the optical pulse.

3. The method according to claim 1 wherein determining the bit $m_B$ includes assigning a binary value based on whether the measured quadrature value $\{x_R, \text{ or } p_R\}$ is positive or negative.

4. The method according to claim 1 further including sending, from the sender, using a laser diode, a coherent state through the optical channel to the receiver.

5. The method according to claim 1 wherein converting the corresponding quadrature values $\{x_A, x_B\}$ or $\{p_A, p_B\}$ into a secret key comprises a reconciliation protocol and a privacy amplification protocol.

6. The method according to claim 1 wherein converting the corresponding quadrature values $\{x_A, x_B\}$ or $\{p_A, p_B\}$ into a secret key comprises performing a Gaussian-modulated coherent states quantum key distribution protocol.

7. A method for coherent optical communications between a sender and a receiver, the method comprising:
selecting, at the sender, two random numbers $\{x_A, p_A\}$;
encoding, at the sender, a bit $m_A$ and random numbers $\{x_A, p_A\}$ on a coherent state being sent through an optical channel to the receiver as an optical pulse, wherein encoding bit $m_A$ on a coherent state comprises phase-shift keying modulation of an optical pulse;
measuring, at the receiver with a heterodyne detector, the X quadrature and the P quadrature of the optical pulse;
determining, at the receiver, the bit $m_B$ using the sign of a measured quadrature values $\{x_R, p_R\}$;
displacing, at the receiver, the measured quadrature values $\{x_R, p_R\}$ based on the value of the bit $m_B$ to achieve displaced values $\{x_B, p_B\}$ of the corresponding X quadrature and P quadrature according to $x_B = x_R + 2m_B - 1$ and $p_B = p_R + 2m_B - 1$, respectively; and
converting, at the receiver and at the sender, the corresponding quadrature values $\{x_A, x_B\}$ and $\{p_A, p_B\}$ into a secret key.

8. The method according to claim 7 wherein the random numbers $\{x_A, p_A\}$ are selected from a Gaussian distribution.

9. A method for coherent optical communications comprising:
transmitting an optical pulse from a laser light source, the optical pulse carrying phase-encoded binary information based on bit $m_A$ and Gaussian-distributed random numbers $\{x_A, p_A\}$;
detecting the optical pulse at an optical coherent receiver, the laser light source and the optical coherent receiver being coupled through an optical channel;
decoding the phase-encoded binary information from the optical pulse by performing optical homodyne detection or optical heterodyne detection; and
generating a quantum key by:
measuring at least one quadrature value of the optical pulse,
determining bit $m_B$ using the sign of the measured quadrature value, and
displacing and resealing the measured quadrature value of the optical pulse using the determined bit $m_B$ to achieve a corresponding quadrature value $\{x_B, p_B\}$ in accordance with $$x_B = \frac{x_R}{\sqrt{T_{ch}\eta}} + (2m_B - 1)\alpha$$

and $$P_B = \frac{P_R}{\sqrt{T_{ch}\eta}} + (2m_B - 1)\alpha,$$

wherein $\alpha$ is an amplitude of the optical pulse and $T_{ch}\eta$ is an overall transmittance.

10. The method according to claim 9 wherein generating the quantum key includes performing a reconciliation and privacy amplification protocol.

11. The method according to claim 9 wherein:
the phase-encoded binary information is encoded in the X or P quadrature of the optical pulse, and
heterodyne detection is used to measure the X and P quadrature of the optical pulse at the optical coherent receiver.

12. The method according to claim 9 wherein the phase-encoded binary information is encoded in the X and P quadrature of the optical pulse.

13. The method according to claim 12 wherein homodyne detection is used to measure the X or P quadrature of the optical pulse at the optical coherent receiver.

14. The method according to claim 9 wherein the Gaussian-distributed random numbers are encoded on two conjugate quadratures of the optical pulse.

15. The method according to claim 9 wherein the Gaussian-distributed random numbers include two random numbers $\{x_A, p_A\}$ from a Gaussian distribution.

16. The method according to claim 9 wherein the laser light source includes a laser diode and wherein the optical coherent receiver includes a homodyne detector or a heterodyne detector.

* * * * *